(12) United States Patent
Wainright et al.

(10) Patent No.: US 8,247,135 B2
(45) Date of Patent: Aug. 21, 2012

(54) LIGHT-WEIGHT, FLEXIBLE EDGE COLLECTED FUEL CELLS

(75) Inventors: Jesse S. Wainright, Willoughby Hills, OH (US); Laurie A. Dudik, South Euclid, OH (US); Chung-Chiun Liu, Cleveland Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 904 days.

(21) Appl. No.: 11/226,139

(22) Filed: Sep. 14, 2005

(65) Prior Publication Data

US 2008/0032170 A1 Feb. 7, 2008

Related U.S. Application Data

(60) Provisional application No. 60/609,580, filed on Sep. 14, 2004.

(51) Int. Cl.
*H01M 4/64* (2006.01)
*H01M 8/24* (2006.01)
*H01M 2/14* (2006.01)

(52) U.S. Cl. ......... 429/517; 429/452; 429/507

(58) Field of Classification Search .......... None
See application file for complete search history.

(56) References Cited

U.S. PATENT DOCUMENTS

| | | | | |
|---|---|---|---|---|
| 5,211,984 A | * | 5/1993 | Wilson | 427/115 |
| 5,458,989 A | * | 10/1995 | Dodge | 429/31 |
| 5,563,004 A | * | 10/1996 | Buzzelli et al. | 429/27 |
| 5,925,477 A | * | 7/1999 | Ledjeff et al. | 429/32 |
| 6,007,932 A | * | 12/1999 | Steyn | 429/31 |
| 7,128,994 B2 | * | 10/2006 | Maeda et al. | 429/32 |
| 2004/0086762 A1 | * | 5/2004 | Maeda et al. | 429/32 |
| 2005/0095487 A1 | * | 5/2005 | Hamrock et al. | 429/33 |

FOREIGN PATENT DOCUMENTS

WO WO03058738 * 1/2003

OTHER PUBLICATIONS

Engaged definition, The American Heritage Dictionary of the English Language, 2007, [online], [retrieved on Jun. 22, 2009], Retrieved from Credoreference using INternet <URL: http://www.credoreference.com/entry/hmdictenglang/engaged>.*

* cited by examiner

*Primary Examiner* — Barbara Gilliam
*Assistant Examiner* — Kwang Han
(74) *Attorney, Agent, or Firm* — Tarolli, Sundheim, Covell & Tummino LLP

(57) ABSTRACT

The invention is a flexible, micro-fabricated fuel cell and fuel cell stack that can be helically wound or bend into cylindrical shapes. The electrolyte is a proton exchange membrane (PEM) upon which can be printed, by ink jet means, the anode and cathode electrodes and the current collectors that convey current to or from the edges of the PEM which has a thickness on the order of 0.001 to 0.010 inch. Pluralities of the series connected fuel cell stacks can be arranged in electrical and physical parallel with one another to provide what are batteries of fuel cell stacks that can be connected by manifolds to sources of fuel and oxidizer. The invention is directed to a thin, light-weight, flexible fuel cell assembly that can be produced in ambient conditions using standard micro-fabrication techniques, such as thick film printing and ink jet deposition. Thick film printing techniques, screen printing or ink jet printing, are used to deposit porous current collectors on either side of the membrane.

29 Claims, 6 Drawing Sheets

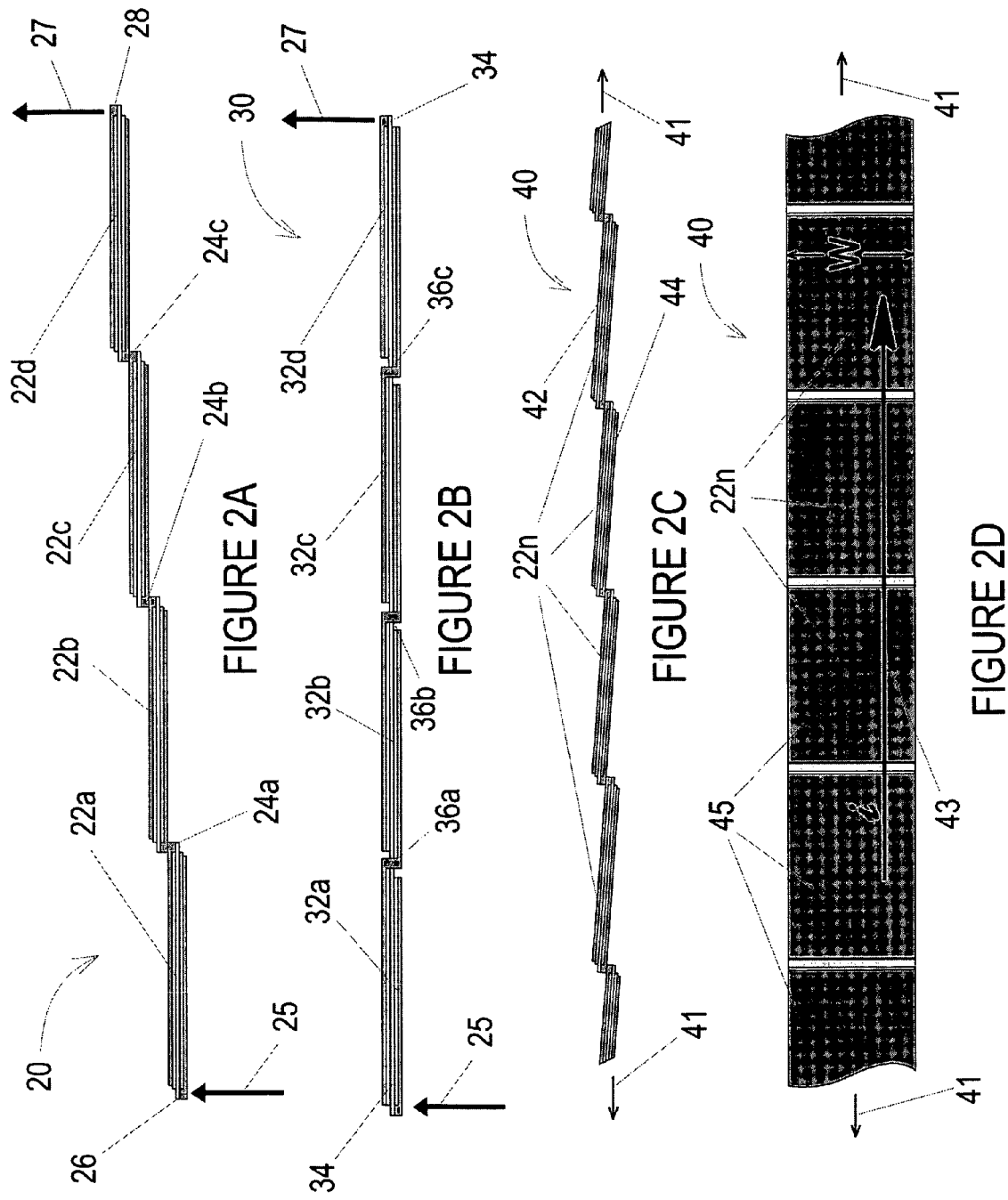

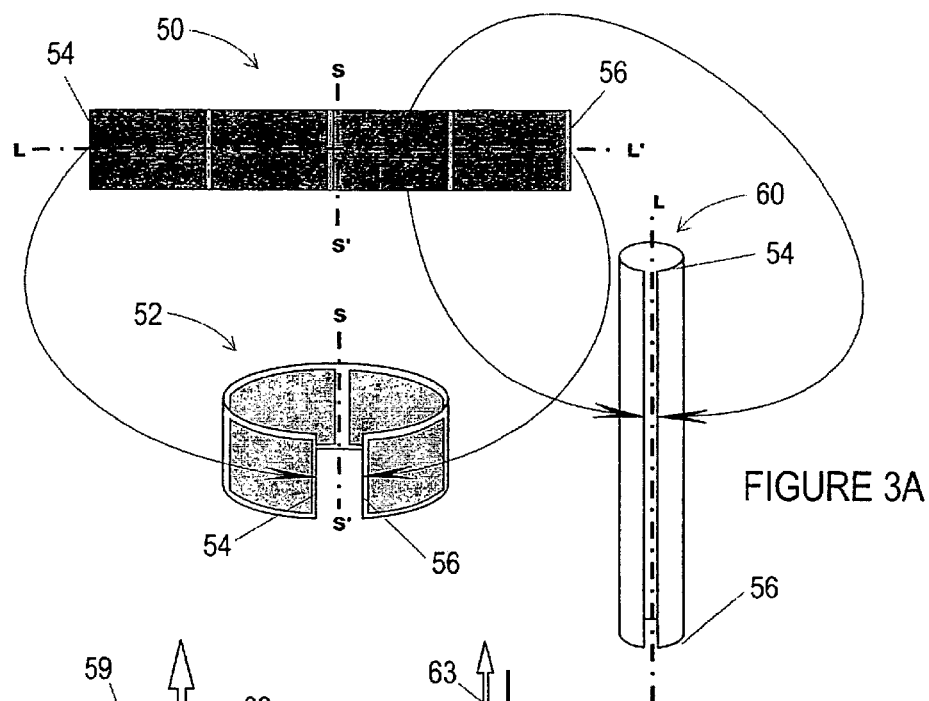
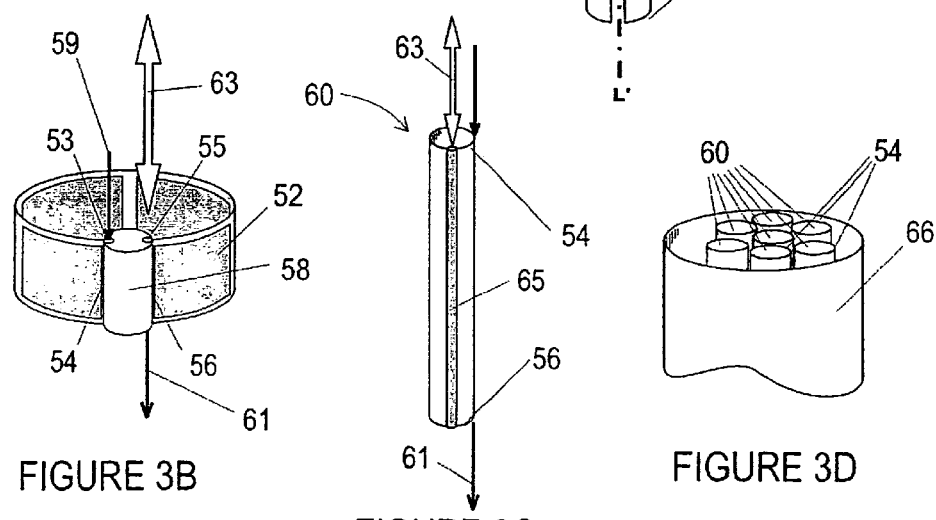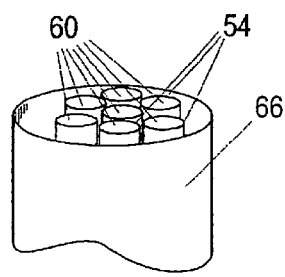
FIGURE 3A
FIGURE 3B
FIGURE 3C
FIGURE 3D

LIGHT-WEIGHT, FLEXIBLE EDGE COLLECTED FUEL CELLS

CROSS-REFERENCE TO RELATED APPLICATIONS

This application claims the benefit of U.S. Provisional Patent Application No. 60/609,580 filed on Sep. 14, 2004, which is incorporated herein by reference.

FEDERALLY SPONSORED RESEARCH

The contents of this application were developed under a Defense Advanced Research Projects Agency Agreement No. F30602-97-2-0311.

FIELD OF THE INVENTION

The present invention relates to polymeric fuel cells. More specifically, the present invention relates to a light-weight, polymeric fuel cell that uses edge-collection of current and can be fabricated under ambient atmospheric conditions.

BACKGROUND

A fuel cell is a direct energy conversion device that generates electricity directly from a fuel source, such as hydrogen gas, and an oxidant, such as oxygen or air. Since the energy conversion process does not "burn" the fuel to produce heat, the thermodynamic limits on efficiency are much higher than normal power generation processes. In essence, the fuel cell consists of two catalytic electrodes and an electrolyte which can be an ion-conducting membrane. The fuel gas (e.g. hydrogen) is oxidized on the anode forming hydrogen ions, and the hydrogen ions diffuse across the membrane to recombine with the oxygen ions on the surface of the cathode. A potential gradient is generated, driving electrons through an external electrical circuit or a load, producing electrical power.

Conventional fuel cell stacks consist of a number of individual components (metal or graphite bi-polar plates, membrane electrode assemblies, gaskets, etc) that are held together by compressive forces. Typically, four separate seals are needed for each cell, and to make those seals tight, significant compressive force on the gaskets is needed. To obtain the necessary compressive force, end plates and screws or bolts are required, adding considerable weight to the fuel cell stack. To achieve good contact between all of the fuel cell pieces, you need significant force that must also be uniform over the entire electrode area, which leads to thick, heavy endplates and lots of strong tie-rods connecting the endplates, squeezing the stack.

Conventional stacks work best when they have large areas and are assembled in relatively short stacks—not too many cells in series. This configuration gives high currents, and low stack voltages. If one cell fails, the stack fails.

SUMMARY OF THE INVENTION

According to the present invention, there is disclosed a micro-fabricated flexible polymeric fuel cell comprising: a proton exchange membrane (PEM) electrolyte layer having a first surface and a second surface and first and second spaced apart edges; a porous cathode layer disposed upon the first surface of the PEM electrolyte layer; a porous anode layer disposed upon the second surface of the PEM electrolyte layer; a porous current collector layer disposed upon the porous cathode layer; and a porous current distributor layer disposed upon the porous anode layer.

Further according to the present invention, the PEM electrolyte layer has a thickness of between about 25 microns and about 250 microns. The porous anode layer and the porous cathode layer each have a thickness of between about 5 microns and about 25 microns. The porous current distributor layer disposed upon the porous anode layer and the porous current collector layer disposed upon the porous cathode layer has a thickness of between about 10 microns and about 100 microns.

Also according to the present invention, the porous cathode layer and the porous anode layer are made from an ink consisting essentially of platinum, carbon, a binder, and a vehicle.

Still further according to the present invention, the porous current collector layer has an edge connector that engages the first surface of the PEM electrolyte layer along the first edge; and the porous current distributor layer having an edge connector that engages the second surface of the PEM electrolyte layer along the second edge whereby current flows from the edge connector of the distributor layer through the fuel cell to the edge connector of the current collector layer.

According to the present invention, there is disclosed at least one micro-fabricated flexible fuel cell stack comprising a plurality of micro-fabricated flexible polymeric fuel cells. Each of the fuel cells comprises: a proton exchange membrane (PEM) electrolyte layer having a first surface and a second surface and first and second spaced apart edges; a porous cathode layer disposed upon the first surface of the PEM electrolyte layer; a porous anode layer disposed upon the second surface of the PEM electrolyte layer; a porous current collector layer disposed upon the porous cathode layer, and having an edge connector that engages the first surface of the PEM electrolyte layer along the first edge; and a porous current distributor layer disposed upon the porous anode layer, and having an edge connector that engages the second surface of the PEM electrolyte layer along the second edge; and each of the fuel cells of the fuel cell stack being connected to each other by their edge connectors in electrical series, and having a first terminal fuel cell and a last terminal fuel cell with the remainder of the plurality of fuel cells disposed therebetween whereby current flows from the edge connector of the first terminal fuel cell distributor layer through the fuel cell stack to the edge connector of the current collector layer of the last terminal fuel cell; the fuel cell stack has a major axis and a minor axis; the porous anode layers of each of the fuel cells of the plurality of fuel cells, and the porous current distributor layers of each of the fuel cells of the plurality of fuel cells are on one side of the fuel cell stack to form an anodic side; and the porous cathode layers of each of the fuel cells of the plurality of fuel cells, and the porous current collector layers of each of the fuel cells of the plurality of fuel cells are on another side of the fuel cell stack to form an cathodic side.

Also according to the present invention, the fuel cell stack is bent into a cylinder having first and second edges extending parallel to the major axis. Further, the first and second edges are sealed to form a cylindrical fuel cell stack whereby reactants can flow axially through the cylindrical fuel cell stack. Moreover, the cylindrical fuel cell stacks are connected in parallel with other cylindrical fuel cell stacks.

Still further according to the present invention, the fuel cell stack is bent into a cylinder having first and second terminal edges extending parallel to the minor axis. Also the first and second terminal edges can be sealed to form a cylindrical fuel cell stack whereby reactants can flow axially through the cylindrical fuel cell stack. In addition, the cylindrical fuel cell stacks are connected in parallel with other cylindrical fuel cell stacks.

Further according to the present invention, the fuel cell stack can be helically wound about an axis. In this case, the adjacent edges of the helically wound fuel cell stack are sealed whereby reactants can flow through the helically would fuel cell stack.

Still further according to the present invention, at two of the at least one fuel cell stacks are abutted against one another such that the anodic sides or the cathodic sides of each of the two fuel cells face one another, and are separated by spacers that allow flow of reactants between the respective fuel cell stacks whose lateral edges are sealed so as to form a duct through which fuel or oxidizer can flow, so as to create a compound flexible fuel cell stack of two parallel connected fuel cell stacks. If desired, the compound fuel cell stack is helically wound about an axis.

According to the present invention, there is disclosed a method of forming a micro-fabricated flexible polymeric fuel cell comprising the steps of: providing a proton exchange membrane (PEM) electrolyte layer having a first surface and a second surface and first and second spaced apart edges; depositing a porous cathode layer upon the first surface of the PEM electrolyte layer; depositing a porous anode layer upon the second surface of the PEM electrolyte layer; depositing a porous current collector layer and an edge connector upon the porous cathode layer; and depositing a porous current distributor layer and an edge connector upon the porous anode layer.

BRIEF DESCRIPTION OF THE DRAWINGS

The structure, operation, and advantages of the present invention will become apparent upon consideration of the description hereinbelow taken in conjunction with the accompanying FIGURES. The FIGURES are intended to be illustrative, not limiting. Certain elements in some of the FIGURES may be omitted, or illustrated not-to-scale, for illustrative clarity. The cross-sectional views may be in the form of "slices," or "near-sighted" cross-sectional views, omitting certain background lines which would otherwise be visible in a "true" cross-sectional view, for illustrative clarity.

Although the invention is generally described in the context of these preferred embodiments, it should be understood that the FIGURES are not intended to limit the spirit and scope of the invention to these particular embodiments.

Elements of the FIGURES can be numbered such that similar (including identical) elements may be referred to with similar numbers in a single FIGURE. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

Figure 1A:
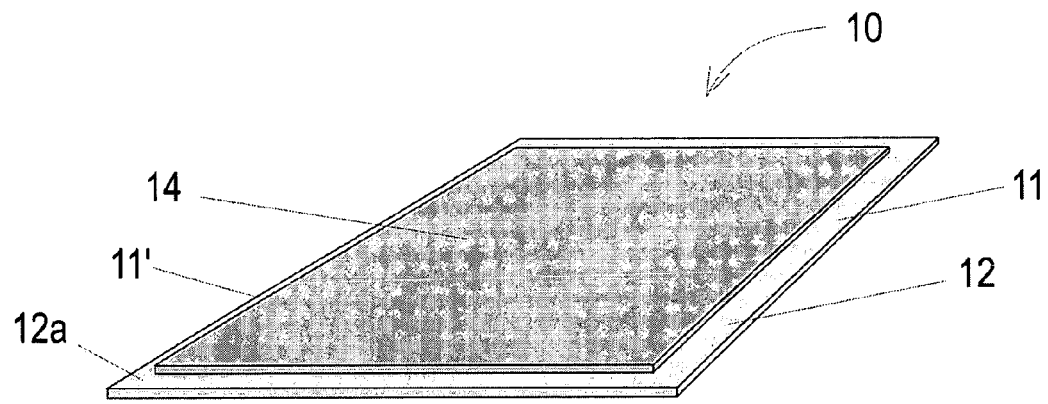

The structure, operation, and advantages of the present preferred embodiment of the invention will become further apparent upon consideration of the following description taken in conjunction with the accompanying FIGURES, wherein:

FIG. 1A is an oblique schematic view of a flat PEM with one electrode in view.

Figure 1B:
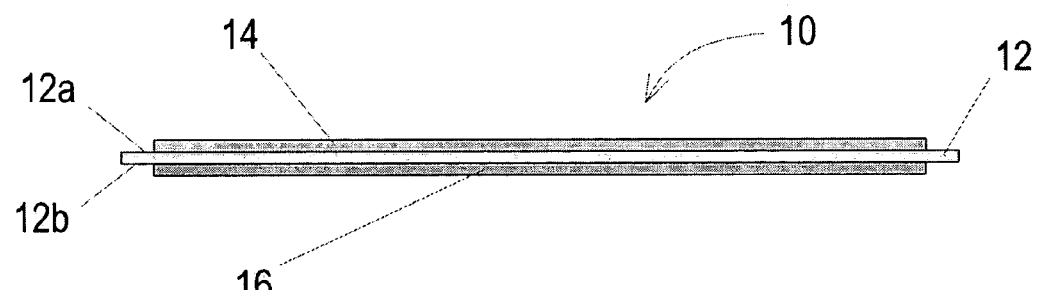

FIG. 1B is an orthogonal schematic side or edge view of the cell of FIG. 1A, but showing printed-on anode and cathode electrodes.

Figure 1C:
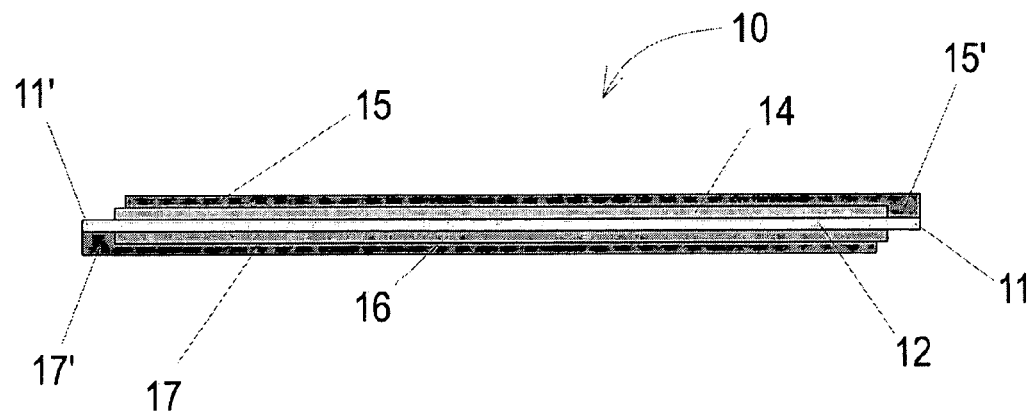

FIG. 1C is same as FIG. 1B, but with printed-on, porous edge collectors.

FIG. 2A is a schematic side view of four edge connected fuel cells forming a fuel-cell stack.

FIG. 2B is a schematic cross-sectional view of an alternative construction of a fuel cell stack according to the present invention, wherein the edge connectors are electrically linked by way of perforations in the PEM.

FIG. 2C is the same as FIG. 2A, but oriented in a fully horizontal position and having indefinite length.

FIG. 2D is a top view of the item in FIG. 2C, shown as a 'ribbon.'

FIG. 3A shows, in schematic view, two ways to form cylinders from series-connected fuel cell stacks.

FIG. 3B is an oblique schematic view of a four-cell fuel-cell stack having an insulating, axially oriented, seal with embedded current carriers.

FIG. 3C is an oblique schematic view of a long, or axially connected cylindrical stack.

FIG. 3D is a schematic view of a tube-in-shell arrangement of a plurality of axially connected cylindrical fuel cell stacks.

Figure 4A:
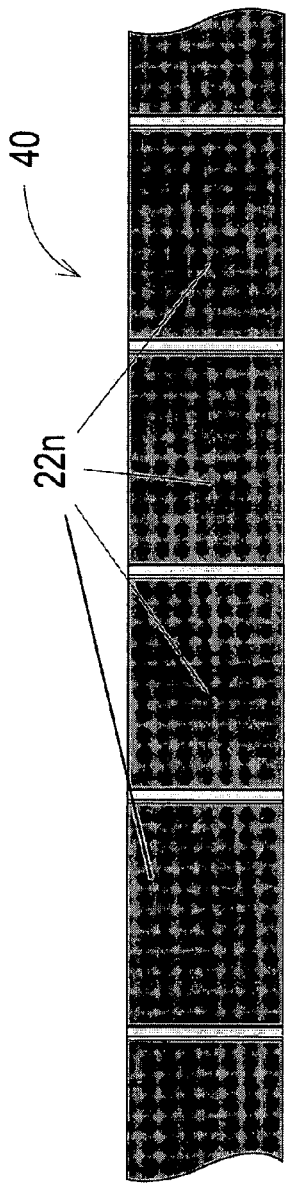

FIG. 4A is same fuel cell stack shown in FIG. 2C, shown as a flat ribbon of indefinite length.

Figure 4B:
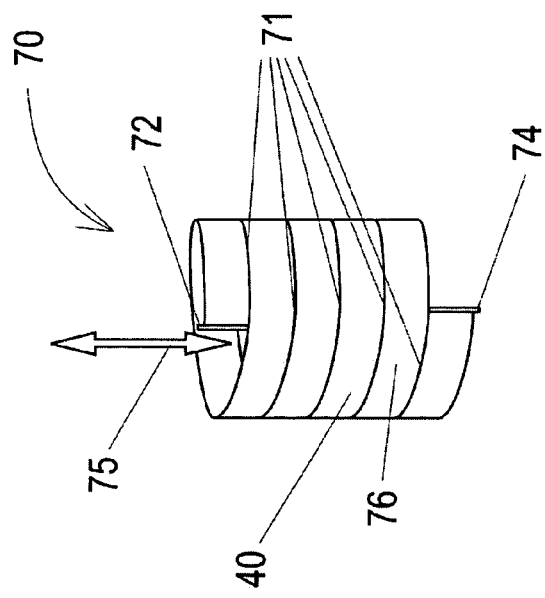

FIG. 4B shows the fuel cell stack of FIG. 4A in a helically wound embodiment.

Figure 5A:
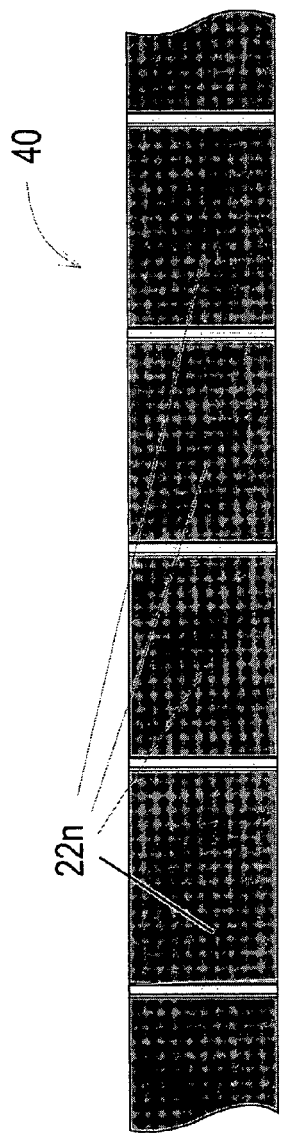

FIG. 5A is the same as FIG. 2C, i.e., a fuel-cell stack in the form of a ribbon consisting of an unlimited number of fuel cell units.

Figure 5B:
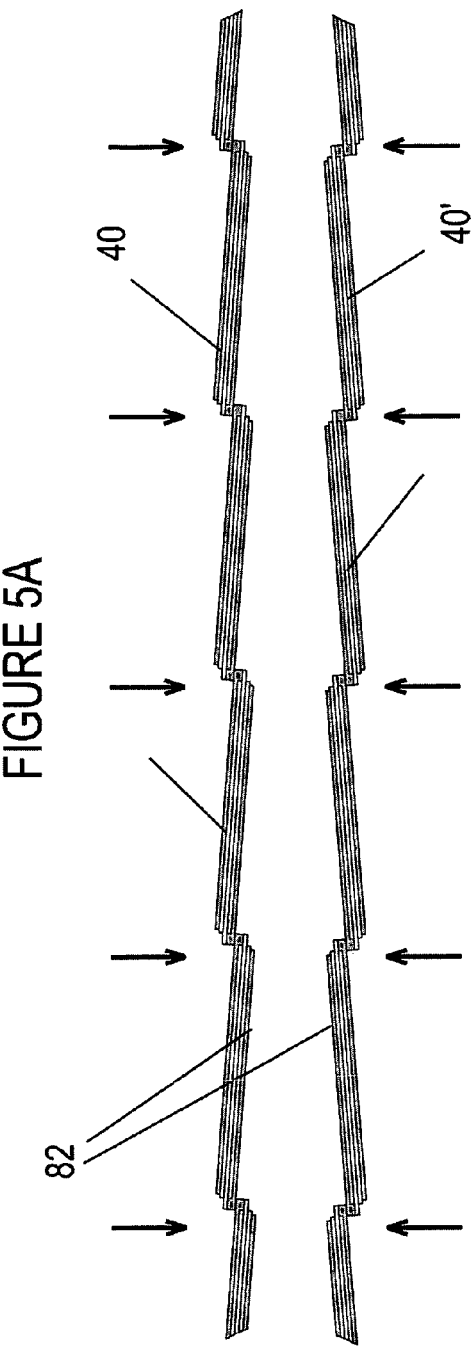

FIG. 5B is a schematic side view of two fuel-cell ribbons being brought together with anode sides of each ribbon facing each other.

Figure 5C:
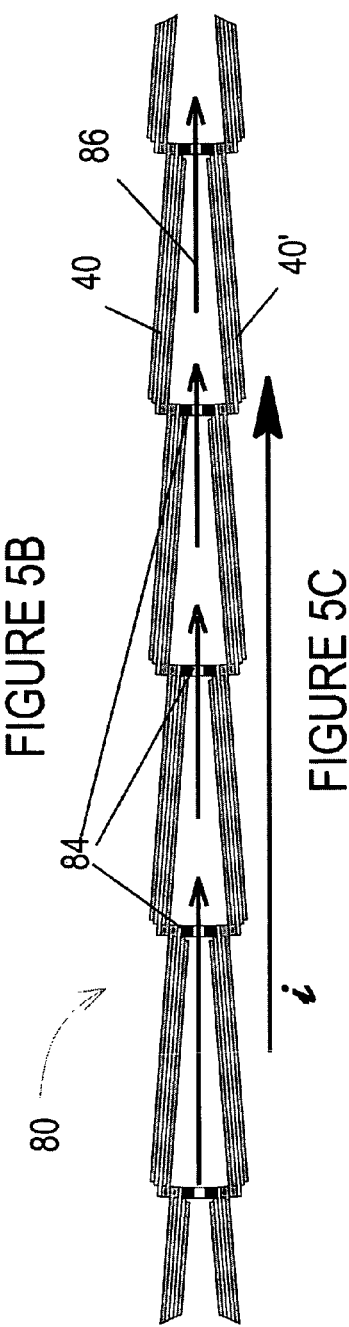

FIG. 5C is a schematic side view of the two ribbons of FIG. 4B with printed-on (or other) spacers between them, also showing reactant flow (which could be either direction).

Figure 6A:
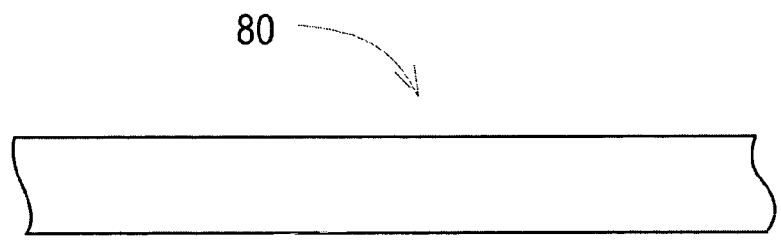

FIG. 6A is a simplified schematic top view of compound fuel-cell stack ribbon in FIG. 5A.

Figure 6B:
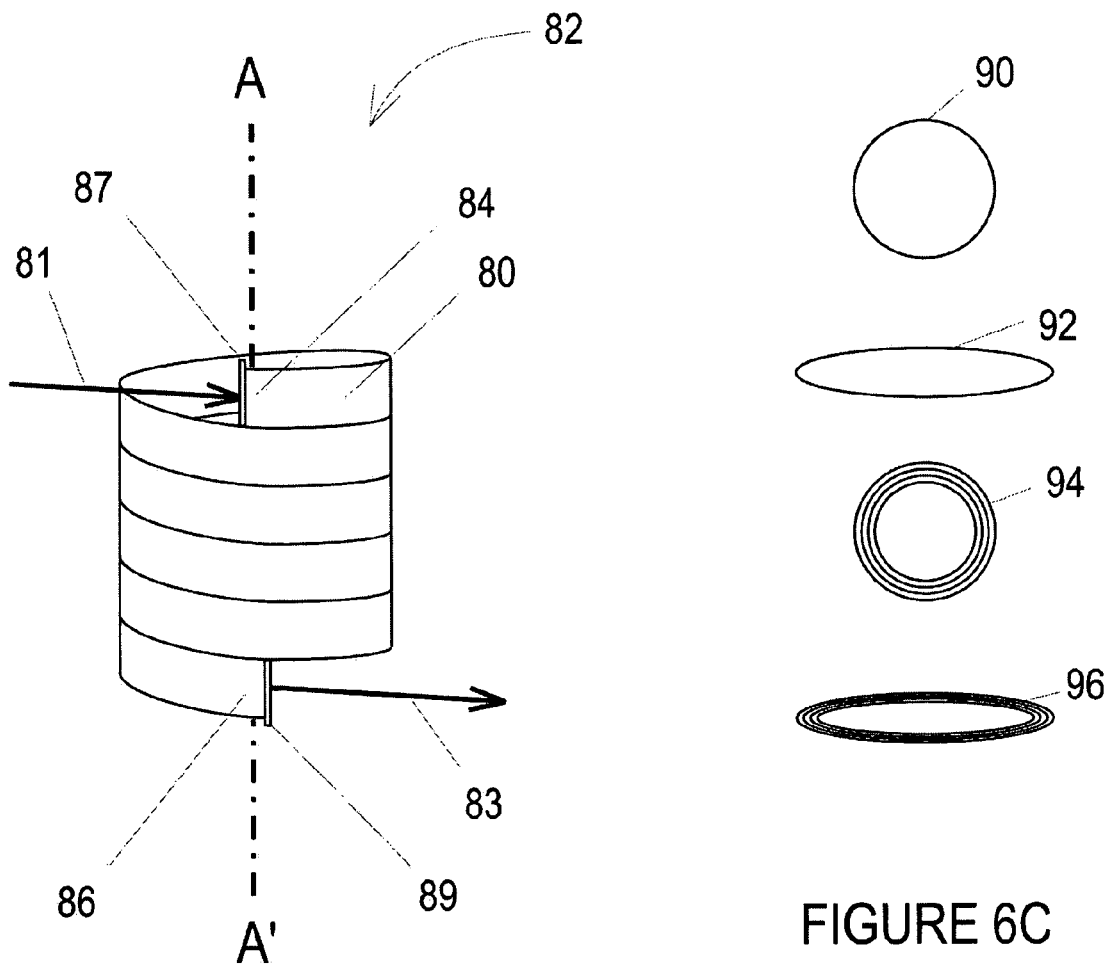

FIG. 6B is an oblique view of a helically wound compound series-connected fuel cell string or ribbon.

Figure 6C:
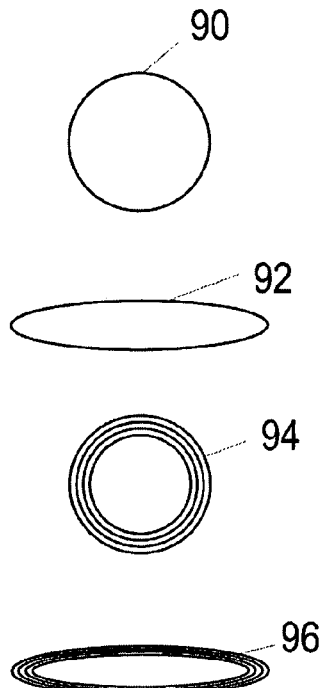

FIG. 6C contains end-on views of circular and oval helices, nested and non-nested.

DEFINITIONS

'Current,' in the context of electrical charge flow, refers to the movement of positive electrical charge carriers and to the reverse movement of negative electrical charge carriers.

'PEM' means proton exchange membrane, a polymer sheet that conveys protons through a polymeric matrix; PEM might refer to a stand-alone proton exchange membrane or to a proton exchange membrane electrolyte; PEM might also be used in such usages as 'PEM electrolyte.'

'Fuel cell' refers herein to a single fuel cell consisting of an electrolyte, two electrodes (anode and cathode) having electrical current conveyance means connected thereto.

'Fuel cell stack' refers to a plurality of individual fuel cells electrically connected in parallel or series or in a combination of parallel and series. The inventor is aware that series and or parallel connected fuel-cell stacks are also commonly referred to simply as fuel cells.

DETAILED DESCRIPTION OF THE PREFERRED EMBODIMENTS

The invention is directed to a thin, light-weight, flexible fuel cell assembly that can be produced in ambient conditions using standard micro-fabrication techniques, such as thick film screen printing and/or ink jet printing.

The flexible fuel cell employs a proton exchange membrane (PEM) as the electrolyte, on the order of 0.001 to 0.002 inches thick, with catalyst layer (electrodes) deposited on both its front and back is used. Thick film printing techniques, screen printing or ink jet printing, are used to deposit porous current collectors on either side of the catalyzed membrane.

The fuel cell assembly is designed as a number of cells, electrically connected in series using edge collection of current through the printed current collectors. The number of cells depends on the voltage the fuel cell needs to deliver and the size/shape of the space the fuel cell must confine to. Each cell consists of an electrolyte membrane with one catalytic electrode layer on each surface. A porous current collector is then deposited using micro-fabrication techniques on the catalyst electrode. One side is the anode of the fuel cell, the other the cathode. The anode of one cell connects to the cathode of the next cell through a high conductivity sealing band to place the cells in series. The cells are connected together using a high conductivity ink or glue. After the connection, the cells are given their final shape by laminating, gluing or otherwise securing a flexible frame. The frame also provides reactant manifolding over the length of the fuel cell assembly. The invented fuel cell assembly is flexible enough that its overall dimensions and shape can be dictated by the amount of power needed and the size/shape of the space dictated by the protective covering and gas supply. For higher power levels, multiple assemblies can be connected in parallel within the appropriate housing or frame providing manifolding of the reactants to each assembly.

FIG. 1A shows in simple schematic view the PEM 12 of a fuel cell 10 according to the present invention. Also shown is one electrode 14 which, for explanatory purposes here, arbitrarily referred to as a cathode electrode.

FIG. 1B is an edge view of the PEM 12, the cathode layer 14 and, on the other side of the PEM, the anode layer 16 of the fuel cell 10. The PEM electrolyte layer 12 has a first surface 12a and a second surface 12b and a first edge 11 that is spaced apart of a second edge 11'.

FIG. 1C is an edge view of the PEM 12, showing the cathode layer 14 overlaid with a current collector 15 which conveys current to its edge 15' which in turn is disposed upon and overlays a first edge 11 of the PEM 12 (also shown in FIG. 1A). On the other side of the PEM 12 is shown the anode layer 16 overlaid with a current distributor 17 that distributes incoming current from an edge region 17' that is disposed and overlays a second edge 11' of the PEM 12. Note that the edges 11,11' of PEM 12 comprise a set consisting of a first opposing edge and a second opposing edge. Note also that while the two current conveying layers 15,17 could both be referred to in a general way as current conveyors or collectors, for explanatory purposes herein, the historical convention of referring to electrical current flow as a flow of positive charges is acknowledged. Accordingly, conventional current flows from edge 17' across the flat conducting surface 17 which distributes it across the anode 16 and then across the PEM 12 and into the cathode layer 14 and then into the collector 15 which conveys the current to the edge 15'. In the remaining description of the present invention, the two current conveyors 15,17 and their respective edges 15',17' might in general be referred to as current collectors or current conveyors interchangeably, or the current conveyor on the anode side might specifically be called a current distributor while the current conveyor on the cathode side might be referred to specifically as a current collector.

The current conveyors might also be referred to 'edge collectors' or 'edge connectors,' as it is one of the characterizing features of present polymeric fuel cell invention, in addition to being flexible, to allow for individual fuel cells 10 to be connected in electrical series by way of the respective edge collector portions 15',17' of the current conveyors, i.e., collector 15 and distributor 17, so as to create a fuel cell stack 20, as discussed further below in reference to FIG. 2A. The edge connectors 15',17' engage (attach to) the PEM layer 12. Electrical current flows from the edge connector 17' of the distributor layer 17 through the fuel cell 10 to the edge connector 15' of the current collector layer 15.

The PEM electrolyte layer 12, according to the present invention, has a thickness of between about 0.001 inch and 0.010 inch. The thickness of the porous anode layer 16 and the porous cathode layer 14, which are printed on to the PEM, are typically about 0.0005 inch (~10 micron), with a range of thickness of between about 5 microns and 25 microns. The ink used in the deposition of the electrodes consists essentially of platinum, carbon, a binder, and a vehicle. The current conveyors 15,17 are also printed on to the electrodes 14,16, and they are porous so as to allow fuel and oxidizer reactants to reach the respective underlying cathode and anode electrode layers. The current conveyors 15,17 have thicknesses of between about 10 microns and 100 microns, with provision being made for greater porosity when thicker layers are used to give greater conductivity. E.g., when printing the current conveyor layers 15,17 with a highly conductive ink (based on gold for example), thin layers on the order of 10 to 20 microns are practicable, but with an ink based on carbon, which is much less conductive, a greater thickness is required. If the anode is fed with pure hydrogen, then the anode current distributors or conveyors can be made thicker without compromising the basic idea of the invention; however, the cathodic current collector is generally made as thin as possible.

The cathode layer 14 and anode layer 16 are porous, in the order of 20 volume percent, to allow reactants to penetrate into then. The pore size has to be small (sub micron). Otherwise, when the current conveyor layers are printed over the electrodes 14,16, the pores in the electrodes can get filled in with current conveyor material.

FIG. 2A shows a fuel cell stack 20 consisting of four fuel cells 22a,22b,22c,22d whose respective (and unnumbered in the FIGURE) edge connectors make series electrical contact with one another at the locations 24a,24b,24c. In accordance with the convention established hereinabove in FIGS. 1A, 1B and 1C, the anode sides of the fuel cells 22a,22b,22c,22d are located on the bottom of the stack 20 of FIG. 2A. Accordingly, current flows into the stack at arrow 25 at the terminal anodic edge connector 26 and out at arrow 27 at the terminal cathodic edge connector 28 of this exemplary four-cell fuel cell stack. Or, said another way, each of the fuel cells 22a,22b,22c,22d of the fuel cell stack is connected to the adjacent fuel cell by their edge connectors 15'17' (FIG. 1C) in electrical series, thus providing a first terminal fuel cell (22a) and a last terminal fuel cell (22d) with the intervening fuel cells disposed therebetween whereby current flows from the edge connector of the first terminal fuel cell distributor layer (not numbered or called out in FIG. 2A) through the fuel cell stack to the edge connector of the current collector layer of the last terminal fuel cell (not numbered in FIG. 2A).

FIG. 2B shows in schematic cross-sectional view an alternative embodiment 30 of the fuel cell embodiment 20 of FIG. 2A. The alternative embodiment 30 consists of four cells 32a,32b,32c,32d whose electrodes and current conveyors are printed on a single, continuous sheet of PEM 34 that has been perforated at the locations 36a,36b,36c so that non-porous conductor can be printed through the PEM 34 so as to provide electrical series connection of the current conveyers of the respective cells.

FIG. 2C is a schematic side view of a fuel cell stack 40 that is similar to the one conveyed in FIG. 2A, but containing an indefinite number of fuel call base units 22n that are connected in series as described hereinabove. The stack 40 is oriented in the view so as to be horizontal rather than tilted upward to the right as in FIG. 2A. In the view of FIG. 2C, and for clarity in the remaining description, the cathodic electrodes and current conveyors are displayed on the top side 42 and the anodic electrodes and current conveyors are displayed on the bottom side 44. Thus, in the view shown in FIG. 2C, the fuel, such as hydrogen, would make contact with the fuel cell stack 40 on the bottom or anodic side 44, while the top side 42 would be exposed to air or oxygen. Conventional electrical current would flow from left to right in the side view of FIG. 2C.

FIG. 2D is a schematic top view of the indefinitely long fuel cell stack 40 of FIG. 2C, showing the plurality fuel cells 22n oriented such that the plurality of visible cathodic surfaces 45 (including current collectors disposed upon underlying cathodes) are visible, while the anodic components are out of view. Current i flows in the direction indicated by the large arrow 43. The small arrows 41 indicate the indefinite length of the fuel cell stack 40 portrayed in FIGS. 2C and 2D.

The series connected fuel-cell stack 40 shown in FIG. 2D is a ribbon of indefinite length. The individual cells 22n are rectangular in shape, though the inventors allow that other shapes are possible. The use of edge collection, as at the locations 24a,24b,24c in FIG. 2A in the provision of a fuel cell stack 20 or 40 (FIG. 2D), it is worth noting that the current conveyors 15,17 (FIG. 1C) have to be porous so as to allow reactants to reach the underlying electrodes, and that said porosity inhibits conductivity of the current collectors such that current can be conveyed over maximum distances of not more than about 2 centimeters. Thus the rectangular shape is in a way dictated by conductivity considerations such as to require rectangular electrodes and current conveyors that can be indefinitely long in the width direction W, yet narrow in the direction of the current flow (arrow 43). The critical length in the direction of current flow 43 is a function of how porous, how thick and how conductive the current conveyors are, but with any combination of reasonable values it is on the order of about 2 centimeters maximum.

Embodiments

The flexible design of the present polymeric fuel cell invention allows for novel embodiments more complex than the basic ones of flat individual fuel cells and fuel cell stacks.

FIG. 3A shows an exemplary four cell ribbon stack 50 having a major or long axis L-L' and a minor or short axis S-S'. The stack 50 could consist of any number of individual fuel cell repeat units, arranged so as to have first and second terminal electrical edge connectors 54,56 where into and from current arrives and departs the stack. Said edges 54,56 are oriented parallel to the axis S-S'. The stack 50 can be bent around its short axis S-S' to produce a short cylindrical 52 of radially connected fuel cells, or it can be bent around its long axis to provide a long cylindrical stack 60 of axially connected fuel cells. Such cylindrical shapes could be circular in cross section or they could be oval or of any other cross-sectional shape, given the flexibility of the basic fuel cell design.

FIG. 3B shows a short cylindrical stack 52 in which the terminal edges 54,56 connect to a non-conducting seal 58 that contains buss bars 53,55 which convey current into (arrow 59) and out of (arrow 61). The short stack 52 would, in actual use, have attached to it a manifold and other elements not shown so as to allow conveyance or flow of fuel axially through the central region as indicated by the double-headed arrow 63, indicating that fuel (or oxidizer, depending on the layout of the fuel cell stack 52 within a larger context) can flow in either direction in the central region if the anode surface faces radially inward. Allowance, not shown, would also be needed to manage current from a battery of such fuel cell stacks.

FIG. 3C is a schematic view of a long, or axially connected cylindrical stack 60 having a seal 65 at the joined sides. Fuel (or oxidizer) can flow axially inside the cylinder in either direction according to the double-headed arrow 63. Current is conveyed into and out of the cylindrical fuel cell stack 60 at the terminal edges 54,56, in accordance with the arrows. The ancillary components that are not shown, but as should be readily evident to those skilled in these arts, would include manifolding, and fuel and air supply systems.

FIG. 3D reveals to tube-in-shell arrangement of a plurality of axially connected cylindrical fuel cell stacks 60, each stack being comprised of any number of individual series connected fuel cells, all disposed within a shell 66. The top edges 54 (or 56) of the cylindrical fuel cell stacks 60 would electrically connect to a common plate (not shown) and to electrical conducting and manifold means for supplying fuel (or oxidizer) to the centers of the cylinders and oxidizer (or fuel) to the centers of the cylinders. That is to say, the plurality of cylindrical cell stacks 60 would be connected in parallel relative to one another.

FIG. 4A is same fuel cell stack 40 shown in FIG. 2C consisting of an unlimited number of fuel cell units 22n. In yet another embodiment 70 shown in FIG. 4B, the fuel cell ribbon is wrapped in a helical winding about an axis, and the contacting edges are sealed against gas flow at the locations 71. At 72,74 are provided terminal edge connected conductors for moving current to and from the helically wound flexible fuel cell stack. Fuel (or oxidizer) flows either direction inside the helically wound flexible fuel cell stack, as indicated by the arrow 75, while oxidizer (or fuel, as circumstances require) makes contact with the outer surface.

FIG. 5A is yet again the same fuel cell stack 40 shown in FIGS. 2C and 4A, consisting of an unlimited number of fuel cell units 22n arranged in a ribbon form. It is important to note, though it should be clear to those skilled in the art, that the porous anode layers of each of the fuel cells 22n of the plurality of fuel cells, and the porous current distributor layers (not called out in FIG. 5A) of each of the fuel cells of the plurality of fuel cells are on one side of the fuel cell stack to form an anodic side, while, correspondingly, the porous cathode layers (not called out in FIG. 5A) of each of the fuel cells 22n of the plurality of fuel cells, and the porous current collector layers of each of the fuel cells of the plurality of fuel cells are on another side of the fuel cell stack to form an cathodic side. FIG. 5B shows two such fuel cell stacks 40,40' being brought together (as indicated by the multiple arrows) such that their respective anode sides 82,82' face each other. FIG. 5C shows, in side view, the two ribbons or fuel cell stacks separated by spacers 84, that are printed onto the respective stacks 40,40' or otherwise provided for so as to ensure the free flow of fuel in the either direction in accordance with the arrows 86 so as to provide a compound fuel cell stack 80 consisting of two fuel cells stacks feeding from the same fuel supply. (Obviously, as conditions warrant, the cathode sides could be inwardly oriented such that oxidizer would flow between the two stacks 40,40'.) As those skilled in the art would recognize, the edges of the two ribbons 40,40' would have to be sealed so as to prevent loss of fuel (or air) from the central region of flow indicated by the arrows 86.

FIG. 6A is a schematic view of the compound fuel cell stack 80 that is shown in more detail in the side view of FIG. 5C. FIG. 6B shows the compound fuel cell stack 80 wrapped in a helix about an axis A-A' to create a helically wound compound fuel cell stack 82. Fuel (or oxidizer) flows in one end 84 of the helically wound compound fuel cell 80 and out the other end 86, in accordance with the flow direction arrows 81,83 respectively. Manifolding (not shown) is attached to the ends 84,86 whereat are also provided terminal edge connected electrical conductors 87,89 for moving current to and from the helically wound compound stack. If fuel is made to flow inside the compound fuel cell stack 80, then air can make contact with the external surfaces of the helically wound compound stack. If air flows inside the stack 80, then the outside and central portions can be presented to fuel.

Finally, FIG. 6C illustrates four of many conceivable sectional views of such helically wound compound fuel cell stacks. There is show a single circular cross-section helix 90, and single oval helix 92, a set of nested circular helices 94 and a set of nested oval helices 96.

Micro-Fabrication

One novel feature of the present fuel cell invention is the micro-fabrication processes used in producing it. The micro-fabrication techniques include, but are not limited to, thick film screen printing and/or ink jet printing to form the current collectors, the catalyst/electrode layers, the edge electrical connectors for each fuel cell, and, if needed, the spacers used in the above-described compound fuel cell stack embodiment. Each component of the micro-fabricated fuel cell is bonded to the adjacent components, and no external force is necessary to hold the fuel cell components together.

Platinum is currently the optimal catalyst that is used for hydrogen fuel cells. For sufficient catalytic activity, high surface area platinum is required. An example of a high surface area platinum is 40% platinum catalyst on Vulcan XC-72®, a carbon support. This catalyst has a surface area of about 60 $m^2/g$, as compared to 20 $m^2/g$ for pure platinum (platinum black).

Mixing the inks can take place in standard laboratory conditions, requiring no special temperature, relative humidity or atmospheric conditions.

The binder and solvent combination that make up the vehicles for the catalyst inks are one of three types of solvents and Nafion® as a binder. Three different solvents have been used during the development of the electrode and electrolyte inks: ethylene glycol (EG), diethylene glycol (DEG), DMSO, isopropanol and glycerol.

The binder used for holding the catalyst powders together to act as an electrode is Nafion®. The Nafion® is obtained as a solution of 5% Nafion® in methanol, ethanol, isopropanol, and water. It is then concentrated using heat and then mixed with one of the solvents listed above and the catalyst powder to form an ink that can be thick film screen or ink jet printed. The electrodes need a conductive binder to adhere the catalyst to the other layers. It must be conductive since the protons and electrons that the catalyst produces from hydrogen need to be in a medium that they can move through to go to the electrolyte and the load, respectively. Therefore Nafion® is used as the binder.

Typical ratios for the vehicle are between 5 and 40% Nafion® in one of the solvents listed above. The ratios for catalyst powder to binder are 1:1, 2:1 and 3:1 based on carbon. The amount of carbon is the weight of the carbon support in the platinum catalyst.

The main requirements for the current collectors are high conductivity and high porosity. Ercon Incorporated (Wareham, Mass.) makes R-464 (DPM-78) Gold Ink for thick film printers.

Fabrication Sequence of Fuel Cell Rollup

1. Produce the solvent/Nafion® mixture for depositing the anode and cathode. This is done by either purchasing a high percentage of Nafion® in alcohol mixture or by purchasing a low percentage of Nafion® in alcohol mixture and concentrating it by heating it. Then add one of the solvents listed above to achieve the desired ink viscosity and other properties.

2. Mix, by hand, homogenizer or sonicator, the platinum on carbon support catalyst powder and the solvent/binder mixture.

3. Print on the commercial Nafion® or other proton exchange membrane a layer of the anode ink. Dry the membrane and ink at 60-110 C.

4. Print on the commercial Nafion® membrane a layer of the cathode ink on the side of the membrane opposite the anode membrane. Dry the membrane and ink at 60-110 C.

5. Print a layer of the conductive current collector on top of the anode. Dry the catalyst coated membrane and conductive ink at 80-110 C.

6. Print a layer of the conductive current collector on top of the cathode. Dry the catalyst coated membrane and conductive ink at 80-110 C.

7. Connect the anode current collector to the cathode current collector of as many cells as you wish to connect. The electrical connection is made using a conductive epoxy which consists of conductive metal particles in an epoxy matrix having a low volume resistivity, on the order of 0.0005 ohms per cm. At this stage the fuel cell can be shaped into its final structure, or that can be done later. Cure the conductive epoxy according to the manufacturer's instructions.

Although the present invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed:

1. A micro-fabricated flexible polymeric fuel cell comprising:
   a proton exchange membrane (PEM) electrolyte layer having a first surface and a second surface and first and second spaced apart edges;
   a porous cathode layer disposed upon the first surface of the PEM electrolyte layer;
   a porous anode layer disposed upon the second surface of the PEM electrolyte layer;
   a porous current collector layer disposed upon the porous cathode layer, wherein the porous current collector layer has an edge connector that directly contacts the first surface of the PEM electrolyte layer along the first edge; and a porous current distributor layer disposed upon the porous anode layer, wherein the porous current distributor layer has an edge connector that directly contacts the second surface of the PEM electrolyte layer along the second edge;

whereby current flows from the edge connector of the distributor layer through the fuel cell to the edge connector of the current collector layer.

2. The micro-fabricated flexible polymeric fuel cell of claim 1 wherein the PEM electrolyte layer has a thickness of between about 25 microns and about 250 microns.

3. The micro-fabricated flexible polymeric fuel cell of claim 1 wherein the porous anode layer and the porous cathode layer each has a thickness of between about 5 microns and about 25 microns.

4. The micro-fabricated flexible polymeric fuel cell of claim 1 wherein:
the porous current distributor layer disposed upon the porous anode layer; and
the porous current collector layer disposed upon the porous cathode layer has a thickness of between about 10 microns and about 100 microns.

5. The micro-fabricated flexible polymeric fuel cell of claim 1 wherein the porous cathode layer and the porous anode layer are made from an ink consisting essentially of platinum, carbon, a binder, and a vehicle.

6. At least one micro-fabricated flexible fuel cell stack comprising:
a plurality of micro-fabricated flexible polymeric fuel cells, each of the fuel cells comprising:
a proton exchange membrane (PEM) electrolyte layer having a first surface and a second surface and first and second spaced apart edges;
a porous cathode layer disposed upon the first surface of the PEM electrolyte layer;
a porous anode layer disposed upon the second surface of the PEM electrolyte layer;
a porous current collector layer disposed upon the porous cathode layer, and having an edge connector that directly contacts the first surface of the PEM electrolyte layer along the first edge; and
a porous current distributor layer disposed upon the porous anode layer, and having an edge connector that directly contacts the second surface of the PEM electrolyte layer along the second edge;
each of the fuel cells of the fuel cell stack being connected to each other by their edge connectors in electrical series, and having a first terminal fuel cell and a last terminal fuel cell with the remainder of the plurality of fuel cells disposed there between whereby current flows from the edge connector of the first terminal fuel cell distributor layer through the fuel cell stack to the edge connector of the current collector layer of the last terminal fuel cell;
the fuel cell stack has a major axis and a minor axis;
the porous anode layers of each of the fuel cells of the plurality of fuel cells, and the porous current distributor layers of each of the fuel cells of the plurality of fuel cells are on one side of the fuel cell stack to form an anodic side;
the porous cathode layers of each of the fuel cells of the plurality of fuel cells, and the porous current collector layers of each of the fuel cells of the plurality of fuel cells are on another side of the fuel cell stack to form an cathodic side.

7. The micro-fabricated flexible fuel cell stack of claim 6 wherein the fuel cell stack is bent into a cylinder having first and second edges extending parallel to the major axis.

8. The micro-fabricated flexible fuel cell stack of claim 7 wherein the first and second edges are sealed to form a cylindrical fuel cell stack whereby reactants can flow axially through the cylindrical fuel cell stack.

9. The cylindrical fuel cell stack of claim 8 connected in parallel with other cylindrical fuel cell stacks.

10. The micro-fabricated flexible fuel cell stack of claim 6 wherein the fuel cell stack is bent into a cylinder having first and second terminal edges extending parallel to the minor axis.

11. The micro-fabricated flexible fuel cell stack of claim 10 wherein the first and second terminal edges are sealed to form a cylindrical fuel cell stack whereby reactants can flow axially through the cylindrical fuel cell stack.

12. The cylindrical fuel cell stack of claim 11 connected in parallel with other cylindrical fuel cell stacks.

13. The micro-fabricated flexible fuel cell stack of claim 6 wherein the fuel cell stack is helically wound about an axis.

14. The fuel cell stack of claim 13 wherein adjacent edges of the helically wound fuel cell stack are sealed whereby reactants can flow through the helically wound fuel cell stack.

15. The micro-fabricated flexible fuel cell stack of claim 6 wherein two of the at least one fuel cell stack are abutted against one another such that the anodic sides or the cathodic sides of each of the two fuel cells face one another, and are separated by spacers that allow flow of reactants between the respective fuel cell stacks whose lateral edges are sealed so as to form a duct through which fuel or oxidizer can flow, so as to create a compound flexible fuel cell stack of two parallel connected fuel cell stacks.

16. The compound flexible fuel cell stack of claim 15 wherein the compound fuel cell stack is helically wound about an axis.

17. A method of forming a micro-fabricated flexible polymeric fuel cell comprising the steps of:
providing a proton exchange membrane (PEM) electrolyte layer having a first surface and
a second surface and first and second spaced apart edges;
depositing a porous cathode layer upon the first surface of the PEM electrolyte layer;
depositing a porous anode layer upon the second surface of the PEM electrolyte layer;
depositing a porous current collector layer and an edge connector upon the porous cathode layer, wherein the edge connector directly contacts the first surface of the PEM electrolyte layer along the first edge; and
depositing a porous current distributor layer and an edge connector upon the porous anode layer, wherein the edge connector directly contacts the second surface of the PEM electrolyte layer along the second edge.

18. A method of forming at least one micro-fabricated flexible fuel cell stack comprising the steps of:
forming a plurality of micro-fabricated flexible polymeric fuel cells, each of the fuel cells being formed by the steps of:
providing a proton exchange membrane (PEM) electrolyte layer having a first surface and a second surface and first and second spaced apart edges;
depositing a porous cathode layer upon the first surface of the PEM electrolyte layer;

depositing a porous anode layer upon the second surface of the PEM electrolyte layer;

depositing a porous current collector layer upon the porous cathode layer along with an edge connector that directly contacts the first surface of the PEM electrolyte layer along the first edge; and depositing a porous current distributor layer upon the porous anode layer along with an edge connector that directly contacts the second surface of the PEM electrolyte layer along the second edge; and connecting each of the fuel cells of the fuel cell stack to each other by their edge connectors in electrical series such that the porous anode layers of each of the fuel cells of the plurality of fuel cells, and the porous current distributor layers of each of the fuel cells of the plurality of fuel cells are on one side of the fuel cell stack to form an anodic side, and the porous cathode layers of each of the fuel cells of the plurality of fuel cells, and the porous current collector layers of each of the fuel cells of the plurality of fuel cells are on another side of the fuel cell stack to form an cathodic side.

19. The method of claim 18 including the further steps of:
abutting two of the at least one micro-fabricated flexible fuel cell stacks against one another such that the anodic sides or the cathodic sides of each of the two fuel cells face one another, and are separated by spacers that allow flow of reactants between the respective fuel cell stacks whose lateral edges are sealed so as to form a duct through which fuel or oxidizer can flow, so as to create a compound flexible fuel cell stack of two parallel connected fuel cell stacks; and winding the compound flexible fuel cell stack of helically wound about an axis.

20. The micro-fabricated flexible polymeric fuel cell of claim 1 wherein the PEM electrolyte layer comprises a continuous PEM electrolyte layer, the current collector layer and current distributor layer directly engaging opposing surfaces of the continuous PEM electrolyte layer.

21. The micro-fabricated flexible polymeric fuel cell of claim 1 wherein the current collector layer and the current distributor layer are separate layers.

22. The micro-fabricated flexible polymeric fuel cell of claim 1 wherein the PEM electrolyte layer spaces the current collector layer from the current distribution layer.

23. The micro-fabricated flexible polymeric fuel cell of claim 6 wherein the PEM electrolyte layer comprises a continuous PEM electrolyte layer, the current collector layer and current distributor layer directly engaging opposing surfaces of the continuous PEM electrolyte layer.

24. The micro-fabricated flexible polymeric fuel cell stack of claim 6 wherein the current collector layer and the current distributor layer are separate layers.

25. The micro-fabricated flexible polymeric fuel cell stack of claim 6 wherein the PEM electrolyte layer spaces the current collector layer from the current distribution layer.

26. The micro-fabricated flexible polymeric fuel cell stack of claim 6 comprising first and second fuel cells, wherein the edge connector of the current collector layer of the first fuel cell engages the edge connector of the current distributor layer of the second fuel cell.

27. The method of claim 17, wherein the porous current collector layer and porous current distributor layers are deposited upon the porous cathode layer and the porous anode layer such that the PEM electrolyte layer spaces the current collector layer from the current distributor layer.

28. The method of claim 18, wherein the porous current collector layer and porous current distributor layers are deposited upon the porous cathode layer and the porous anode layer such that the PEM electrolyte layer spaces the current collector layer from the current distributor layer.

29. The method of claim 18 wherein the step of forming a plurality of fuel cells comprises forming first and second fuel cells, the edge connector of the current collector layer of the first fuel cell being directly connected to the edge connector of the current distributor layer of the second fuel cell.

* * * * *